Oct. 20, 1953   V. E. LAGRANGE   2,655,792
HEATING APPARATUS FOR FUEL TANKS
Filed Nov. 30, 1950
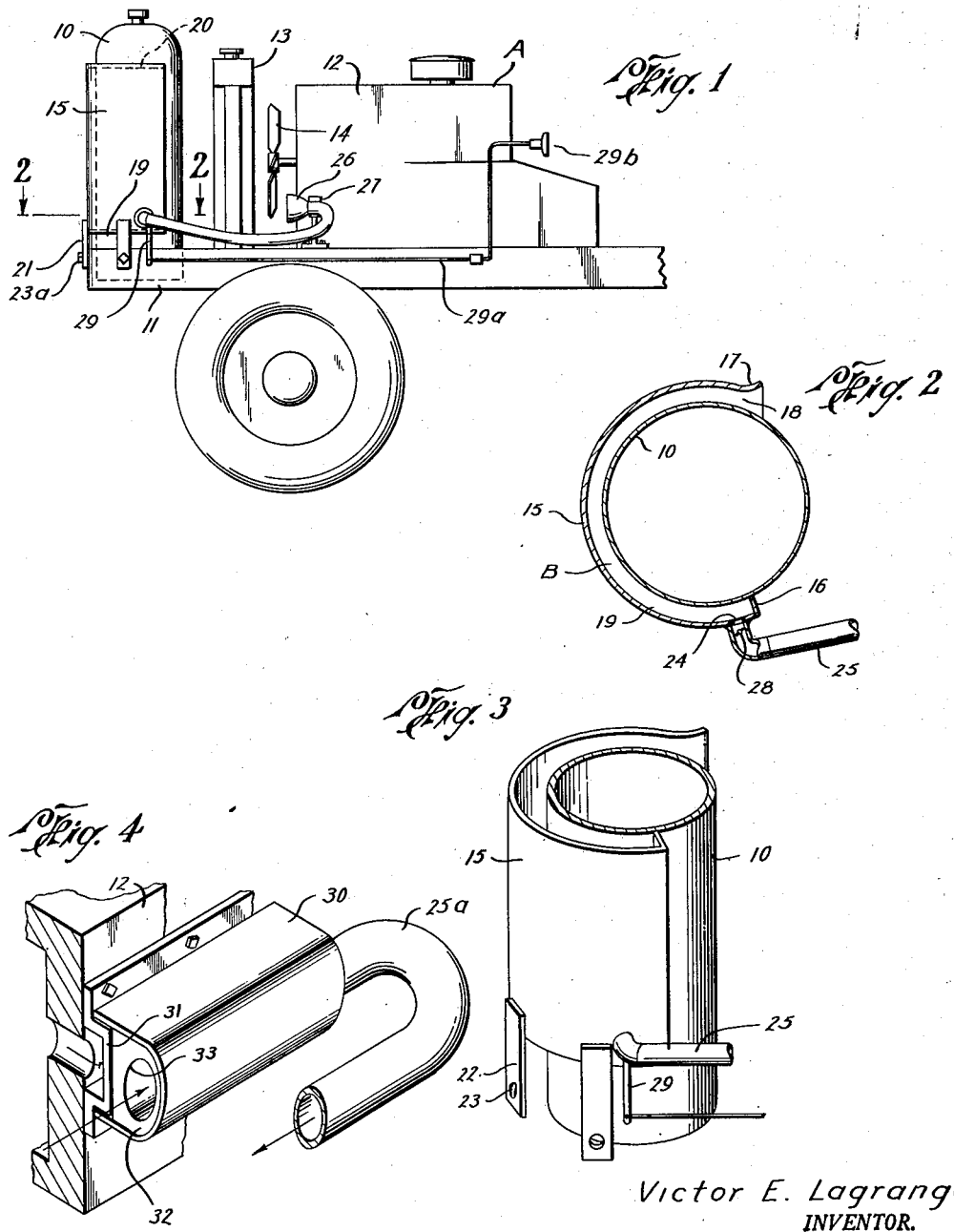
Victor E. Lagrange
INVENTOR.
ATTORNEYS Patented Oct. 20, 1953

2,655,792

UNITED STATES PATENT OFFICE 2,655,792

HEATING APPARATUS FOR FUEL TANKS

Victor E. Lagrange, Lake Charles, La.

Application November 30, 1950, Serial No. 198,348

4 Claims. (Cl. 62—1)

This invention relates to new and useful improvements in heating apparatus for fuel tanks and relates particularly to the heating of motor vehicle fuel tanks containing liquefied petroleum gas.

Liquefied petroleum gas, such as butane and commonly referred to in the industry as "L. P. G.," is widely used as a fuel for internal combustion engines and has been found generally satisfactory. However, where this fuel is employed for the engine of a motor vehicle such as tractors and trucks, the widely variable load requirements occasioned by the operation of the vehicle result in an uneven or variable rate of withdrawal of the fuel from the fuel tank. In the case of tractors particularly, it has been found that under operating conditions, the loss of the latent heat of vaporization caused by a rapid rate of withdrawal of the gas from the fuel tank causes a temperature reduction in the fuel tank which will liquefy the fuel and thereafter interrupt the operation of the engine due to the lack of a gas supply.

It is, therefore, one object of this invention to provide an improved heating means for a motor vehicle fuel tank which contains liquefied petroleum gas, wherein the source of heat is the engine of the vehicle, whereby the necessity for providing an auxiliary or separate source of heat is obviated.

An important object of the invention is to provide an improved heating apparatus for the "L. P. G." tank of a motor vehicle, which apparatus includes means for directing a portion of the heat from the engine of the vehicle into close contact with the exterior of the fuel tank whereby the applied heat will replace latent heat loss of vaporization to assure an ample gas supply under all operating conditions.

Another object is to provide an apparatus, of the character described, including a shield element which partially surrounds the fuel tank, together with means for circulating heated air from the vehicle engine into the space between said shield and the tank to replace the latent heat loss of vaporization of the "L. P. G." fuel.

A further object is to provide an apparatus of the character described wherein the required heat may be supplied either from the air which is warmed as it passes through the radiator of the water cooling system of the engine or from the hot exhaust manifold of said engine.

A still further object is to provide a heating apparatus for fuel tanks which is in the form of an attachment, whereby the apparatus may be readily applied to a tractor without any change in the standard construction of said tractor.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a side elevation of a heating apparatus constructed in accordance with the invention and illustrating the same applied to the fuel tank of a tractor, Figure 2 is a horizontal cross-sectional view taken on the line 2—2 of Figure 1, Figure 3 is an isometric view of the fuel tank and shield which partially surround said tank, and Figure 4 is a partial isometric view of a modified form of the invention.

In the drawings, the numeral 10 designates the fuel tank of a tractor A, which tank is mounted on the extended side frame bars 11 of the tractor at the forward end thereof. The tractor includes the usual internal combustion engine 12 which has an ordinary water cooling system including the radiator 13. The usual fan 14 of the engine is disposed adjacent the radiator and functions to pull the cool air through the radiator to cool the water circulating through the radiator. It is noted that the mounting of the fuel tank 10 at the forward end of the tractor is usual practice.

It has been found that when liquefied petroleum gas is employed as the fuel for the engine 12 of the tractor A, the normal operation of the tractor results in a variable rate of withdrawal of the gas from the tank. Under certain conditions this rate of withdrawal may be excessive with the result that the loss of latent heat of vaporization of the liquefied petroleum gas causes an extreme cooling of the interior of the fuel tank; in many instances, this cooling effect due to the rapid rate of withdrawal will result in liquefying all of the fuel in the tank and no gas is available for the operation of the engine. It is apparent that to maintain the operation of the engine the heat loss due to vaporization must be replaced to assure an adequate supply of gas.

For the purpose of replacing this loss, the present apparatus is provided and includes a shield 15 which partially surrounds the fuel tank 10 as is clearly shown in Figure 2. One vertical end of the shield is bent inwardly to provide a wall or baffle 16 which engages the surface of the tank while the opposite vertical edge portion of the shield is curved outwardly as indicated at 17 to provide a Venturi throat passage 18 between this curved end portion and the wall of the tank. As is indicated in Figure 2, the shield 15 is spaced from the outer surface of the circular wall of the tank 10 and generally follows the contour thereof to provide a passage B between the shield and the tank. A lower wall 19 extends from the lower edge of the shield inwardly in abutting relation to the outer surface of the tank and a similar upper wall 20 extends from the upper end of the shield into engagement with the tank wall. Thus, the passage B is enclosed at one end by the baffle or wall 16, at the bottom by the wall 19 and at the top by the wall 20, with the only outlet from the passage B being through the Venturi throat passage 18.

The shield 15 may be mounted in position encircling a portion of the fuel tank in any suitable manner and as illustrated, said shield is formed with downwardly extending bracket arms 22 which may have their upper ends welded or otherwise secured to said shield. The lower end of each bracket arm has an opening 23 through which fastening bolts 23a may extend. The bolts 23a are adapted to be threaded into the supporting frame members 11 of the tractor, which members also mount the fuel tank 10. With this arrangement, the shield is readily applied and mounted in position adjacent the usual fuel tank without any change in the construction of the tractor or tank.

For circulating heated air within the passage B in close proximity to the outer wall of the fuel tank 10, the shield 15 is provided with an inlet opening 24 which is located in its lower portion adjacent the closed end 16 of the shield. A hose or conductor 25 has one end suitably secured to the shield and communicates with the inlet opening 24. The opposite end of the conductor 25 has an air inlet funnel 26 secured thereto and this funnel is mounted adjacent the inner side of the engine fan 14, being supported by a suitable bracket 27. It will be evident that when the engine is operating and the fan is drawing air through the radiator 13 the hot water circulating through the radiator will function to heat the air and this heated air will be directed into the funnel 26. It is preferable that the funnel 26 be disposed nearer the outer periphery of the fan 14 since maximum air movement is obtained at this point.

The heated air which is forced into the funnel 26 passes through the conductor or duct 25 and is forced into the passage B. Since the passage B formed between the shield 15 and the tank 10 is closed at one end by the wall 16 and at its upper and lower ends by the walls 19 and 20, the heated air is moved circumferentially around the exterior surface of the fuel tank and escapes outwardly through the Venturi throat or passage 18. In flowing around the exterior surface of the tank and in being maintained in direct contact therewith by the confining shield 15, the air will function to heat the fuel within the tank 10 and will thereby replace the loss of latent heat due to vaporization of the liquefied petroleum gas.

For controlling the volume of heated air which is circulated through the passage a control baffle or valve 28 is preferably mounted in the air conductor 25 adjacent the inlet 24 of the passage B. The valve is of the butterfly or damper type and has an actuating arm 29 which controls the position of the valve. The arm 29 may be actuated by means of a cable 29a which is preferably operated by a control button 29b on the instrument panel of the tractor. The fuel tank is ordinarily provided with a vapor pressure gauge (not shown) and by noting the reading on this gauge the operator may adjust the valve 28 to supply more or less heat to the passage B and thereby maintain the required vapor pressure within the fuel tank to assure an ample gas supply at all times. It is pointed out that the valve 28 may be automatically, instead of manually, controlled and in such instance a suitable thermostat (not shown) mounted in the fuel tank would be connected to the control arm 29. With such arrangement the volume of heated air circulating through the passage B will be controlled directly in accordance with the conditions within the fuel tank to thereby assure maintenance of the proper vapor pressure at all times.

When the engine is idling and the engine fan 14 is operating at a relatively slow speed the circulation of air through the passage B is assisted by the provision of the Venturi throat 18 which creates a differential across this throat or passage to assist in maintaining the circulation of heated air around the fuel tank during idling of the engine.

It will be evident that the apparatus may be readily applied to the standard "L. P. G." fuel tank without any change in the structure of the fuel tank or tractor. The shield may be secured in any position around a portion of the tank and the exact area of the tank which is enclosed is subject to some variation; it has been found that efficient operation can be maintained by extending the shield around approximately two-thirds of the circumference of the tank but this figure is given as exemplary only since the shield may vary in size. So long as the shield encloses a sufficient portion of the tank to apply enough heat to replace the latent heat loss and maintain the vapor within the tank, the purposes of the invention will be accomplished.

In Figures 1 to 3, the source of heated air has been illustrated as the air which is drawn through the radiator of the tractor but it is apparent that the source of heat may be the exhaust manifold of the tractor. In Figure 4 a modification is illustrated, wherein a generally semi-circular housing 30 is attached around a portion of the exhaust manifold 31 of the tractor engine 12. Each end of the housing is closed by an end plate 32 having an opening 33 therein. The opening 33 in the forward end plate is opened to permit the entry of air while an air conductor or duct 25a has connection with the opening in the rear end plate. It will be evident that the heat from the exhaust manifold 31 of the engine will heat the air flowing through the housing 30 and this heated air will pass into the conductor 25a. The other end of the conductor 25a is, of course, connected to the inlet opening 24 of the shield 15 and thus the hot air will be circulated through the passage B formed between the shield and the tank. The conductor 25a may have the butterfly or damper valve 28 connected therein in the manner described with reference to the conductor 25. The function of this apparatus in this form will be identical to that of the first form, with the only difference being that the source of heat for heating the air circulated around the fuel tank being the exhaust manifold rather than the radiator of the engine. In both forms of the invention, the engine of the tractor functions as the source of heat for the air which is circulated around the fuel tank to replace the latent heat loss of vaporization of the "L. P. G." fuel to maintain the required vapor pressure within the tank and assure an ample gas supply under all operating conditions.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described the invention, I claim:

1. The combination with a motor vehicle having a fuel tank containing liquefied petroleum gas, of a heating apparatus including, a shield encircling a portion of the fuel tank in spaced relationship thereto whereby an air circulating passage is formed between the exterior of the tank and said shield, and an air conduit having one end connected to the passage and its opposite end open and disposed adjacent the inner portion of the fan of the vehicle engine, whereby the air passing through the radiator of the engine and heated thereby is directed through the conduit and circulated through the passage.

2. The combination as set forth in claim 1, together with valve means in the conduit for controlling the volume of air flowing to the passage.

3. The combination as set forth in claim 1, together with valve means in the conduit for controlling the volume of air flowing to the passage, and manually operated means on the instrument panel of the vehicle for controlling operation of the valve.

4. The combination with a motor vehicle having a fuel tank containing liquefied petroleum gas, of a heating apparatus including, a shield encircling a portion of the fuel tank in spaced relationship thereto whereby an air circulating passage is formed between the exterior of the tank and said shield, an air conduit having one end connected with the passage, a housing surrounding the exhaust manifold of the engine of the vehicle and having an air inlet at its forward end, and means for connecting the rear portion of the housing to the other end of the conduit, whereby air passing through the housing is heated by the exhaust manifold and then is conducted by the conduit to the passage.

VICTOR E. LAGRANGE.

References Cited in the file of this patent

UNITED STATES PATENTS

| Number | Name | Date |
|---|---|---|
| 1,337,555 | Harris | Apr. 20, 1920 |
| 1,373,477 | Angus | Apr. 5, 1921 |
| 1,802,669 | Otwell | Apr. 28, 1931 |
| 1,973,142 | Day et al. | Sept. 11, 1934 |
| 2,184,908 | Do Hun Chan | Dec. 26, 1939 |
| 2,188,072 | Brown | Jan. 23, 1940 |
| 2,231,525 | Breitling | Feb. 11, 1941 |
| 2,285,907 | Cunningham et al. | June 9, 1942 |
| 2,548,051 | Peck | Apr. 10, 1951 |

FOREIGN PATENTS

| Number | Country | Date |
|---|---|---|
| 107,871 | Great Britain | July 19, 1917 |